Feb. 23, 1937.                  P. MEURA                    2,071,891
                                 FILTER
                         Filed Nov. 20, 1933            4 Sheets-Sheet 1

Inventor
Paul Meura
By Hardway Cather
Attorneys

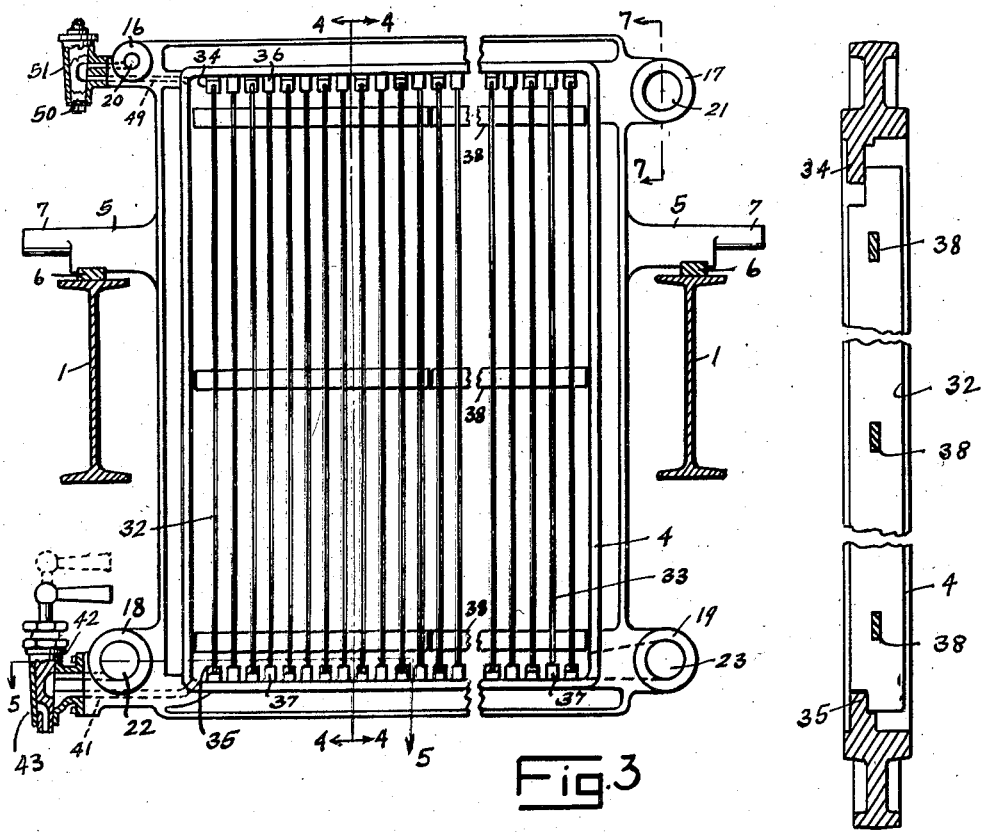
Fig.3
Fig.4.
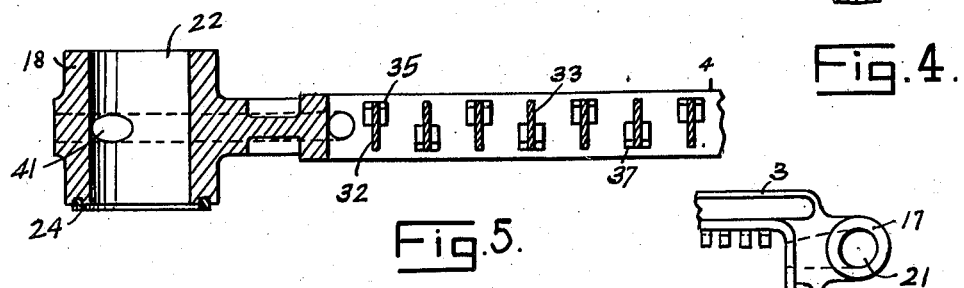
Fig.5.
Fig.6.
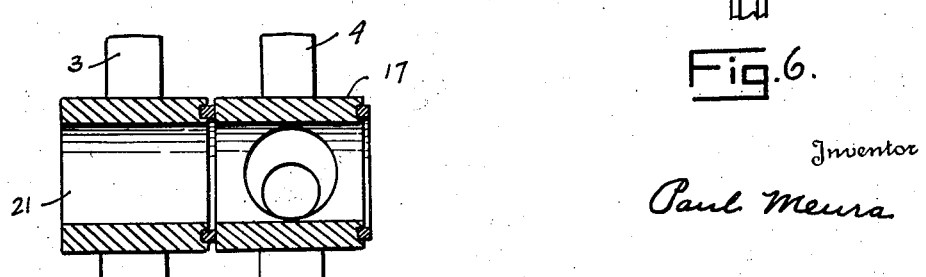
Fig.7.
Inventor
Paul Meura
By
Hardway Cathey
Attorneys Feb. 23, 1937. P. MEURA 2,071,891
FILTER
Filed Nov. 20, 1933 4 Sheets-Sheet 4
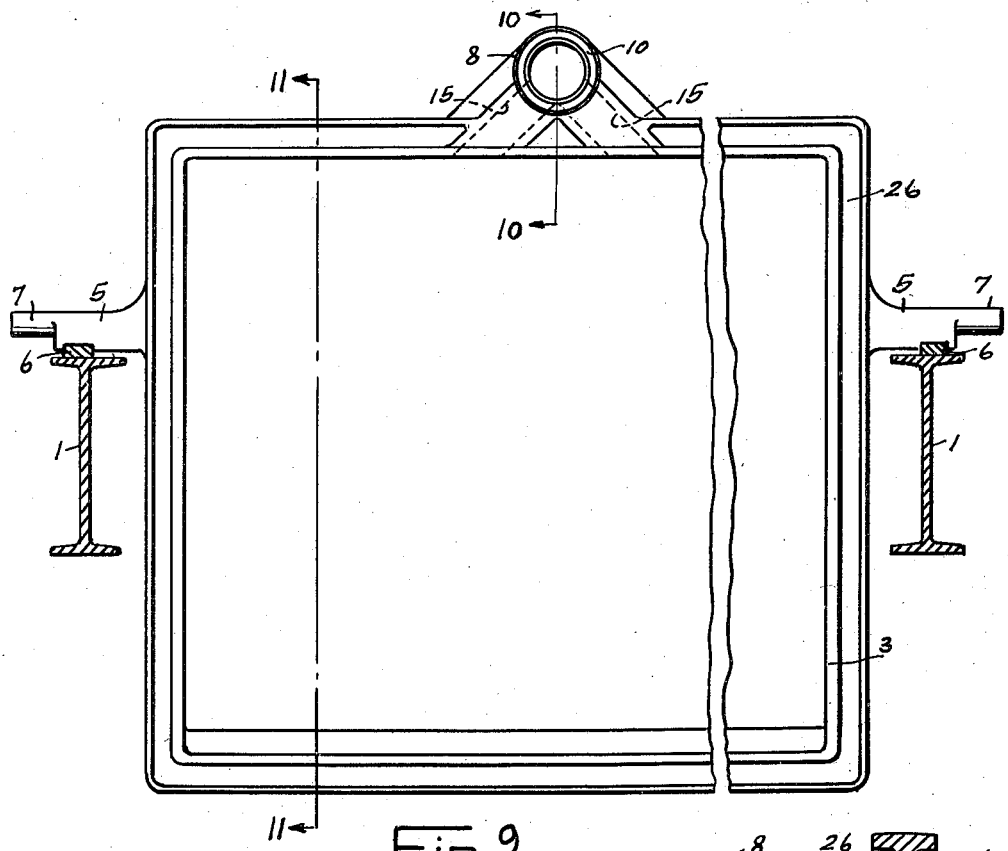
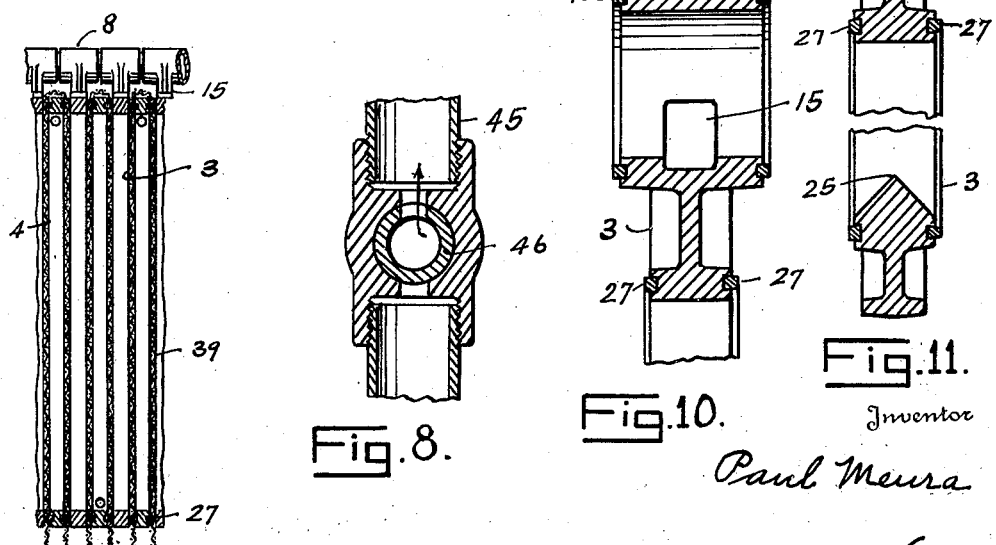
Inventor
Paul Meura
By Hardway Lathey
Attorneys Patented Feb. 23, 1937

2,071,891

UNITED STATES PATENT OFFICE 2,071,891

FILTER

Paul Meura, Tournai, Belgium

Application November 20, 1933, Serial No. 698,869

8 Claims. (Cl. 210—188)

This invention relates to a filter, and has particular relation to that type of filter which is specially adapted for use in breweries, and distilleries.

An object of the invention is to provide, in a filter of this character, a filtering chamber having a series of hollow frames for containing the brew grain, and of a novel construction hereinafter more particularly described and arranged alternately with the hollow frames a series of grate frames of novel construction and having a fabric covering whereby the wort may be efficiently filtered from the brew grain.

Another object of the invention resides in a novel arrangement for washing the brew grain so as to obtain all of the wort therefrom, when a batch of mash has been run, preparatory to the discharge of the brew grain from the chamber, so that the filter may be prepared for another run of mash.

Another object of the invention resides in novel means for controlling the discharge of air from said chamber and for determining the course of circulation of the water therethrough at the end of a run of mash.

With the above and other objects in view, which will be more accurately disclosed hereinafter, the invention has particular relation to certain novel features of construction, operation and arrangement of parts, an example of which is given in this specification and illustrated in the accompanying drawings wherein.

Figure 3 shows an elevational view of one of the grate frames employed.

Figure 4 shows a sectional view thereof taken on the line 4—4 of Figure 3.

Figure 5 shows an enlarged fragmentary cross sectional view taken on the line 5—5 of Figure 3.

Figure 6 shows an enlarged fragmentary side elevation of one of the grate frames.

Figure 7 shows an enlarged fragmentary cross sectional view taken on the line 7—7 of Figure 3.

Figure 8 shows an enlarged fragmentary vertical sectional view taken on the line 8—8 of Figure 1.

Figure 9 shows an elevational view of a hollow frame employed.

Figure 10 shows an enlarged fragmentary cross sectional view thereof taken on the line 10—10 of Figure 9.

Figure 11 shows an enlarged fragmentary vertical sectional view thereof taken on the line 11—11 of Figure 9, and Figure 12 shows a fragmentary longitudinal vertical sectional view of the frame assembly.

Figure 1:
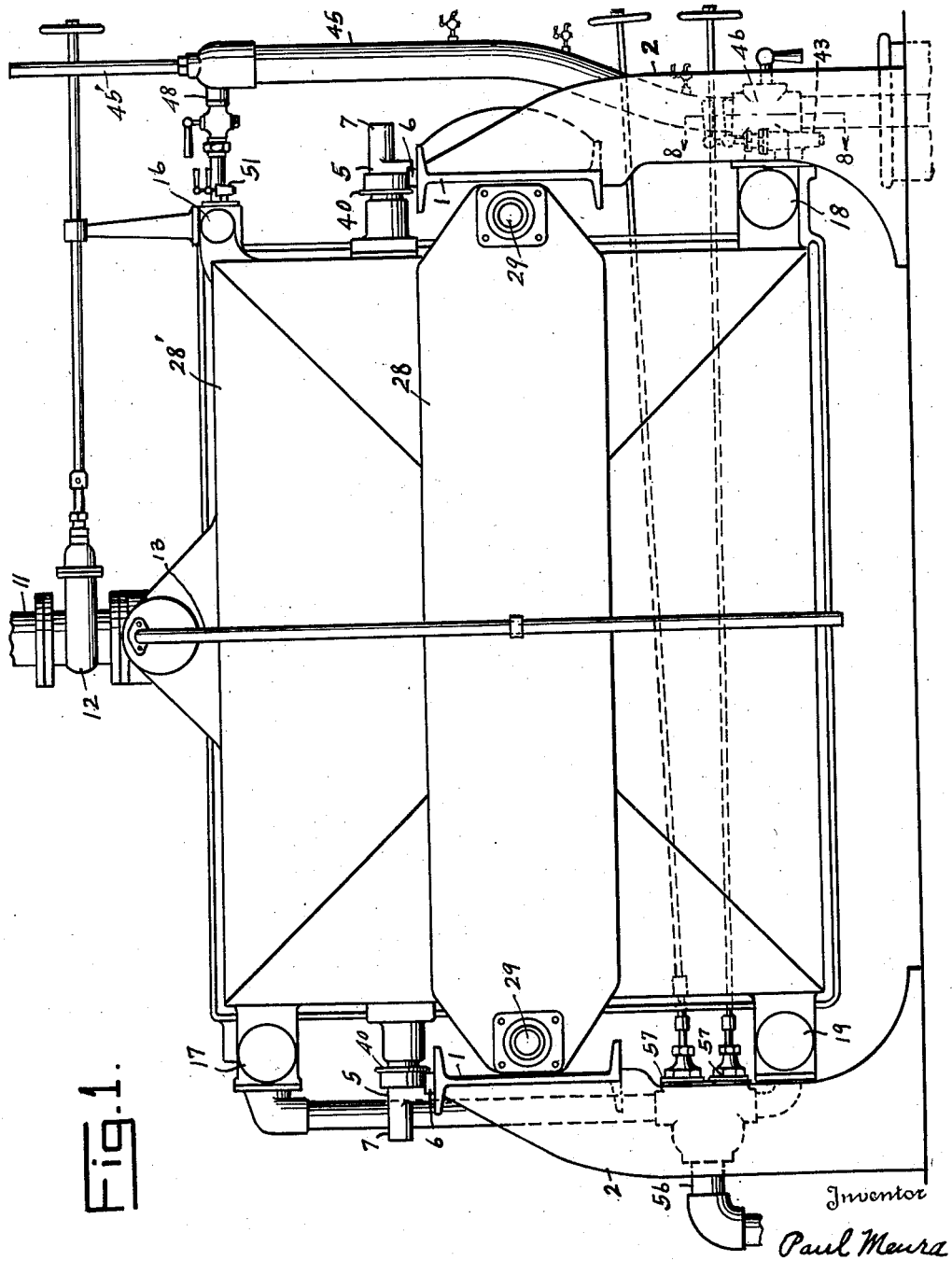
Figure 1 shows a front elevation of the filter.

Referring now more particularly to the drawings, wherein like numerals of reference designate the same parts in each of the figures, the numerals 1, 1 designate the side members of the supporting framework which are shown as I-beams and which are supported by the legs 2 on a suitable foundation.

Between and supported by the I-beams are the hollow frames and the grate frames 3 and 4 which are alternately arranged. These frames 3 and 4 have the side arms 5, 5, whose under sides have the runners 6, 6 which are slidable along the beams 1. The arms 5 terminate in the grips 7 whereby said frames may be moved, for the purposes hereinafter stated. The frames 3 and 4 are preferably, though not necessarily, rectangular in form. At the upper sides of the hollow frames 3 are the tubular heads 8 which align when the frames are assembled forming an inlet pipe for the inlet of the mash to be filtered. The joints between these heads are packed by suitable packing as 10. A supply pipe 11 enters the inlet pipe at one end leading from the vat and controlled by the valve 12, and through this supply pipe the mash may be supplied to said inlet pipe. Leading from the other end of the inlet pipe there is a relief line 13 which is controlled by the valve 14 through which the air may be relieved from the inlet pipe as required so as to prevent trapping of said air.

The heads 8 have the downwardly diverging channels 15, 15 leading therefrom through which the mash may enter the hollow frames 3. The grate frames have, at each corner, or angle, the tubular upper heads 16, 17 and tubular lower heads 18, 19 which align when the frames are assembled forming the upper channels 20, 21 and the lower channels 22, 23. The joints between these heads 16, 17, 18 and 19 are broken by suitable annular packing as 24 to make said joints fluid tight.

Each hollow frame consists merely of a rectangular frame work as more clearly illustrated in Figure 11 and the lower transverse bar at each hollow frame has the upwardly converging sides which terminate in the apex 25. These frames are formed of metal and are channeled on each side as at 26 for lightness. The joints between the hollow frames and the grate frames are broken by packing 27 which extends entirely around said hollow frames on each side, so as to form fluid tight joints.

Figure 2:
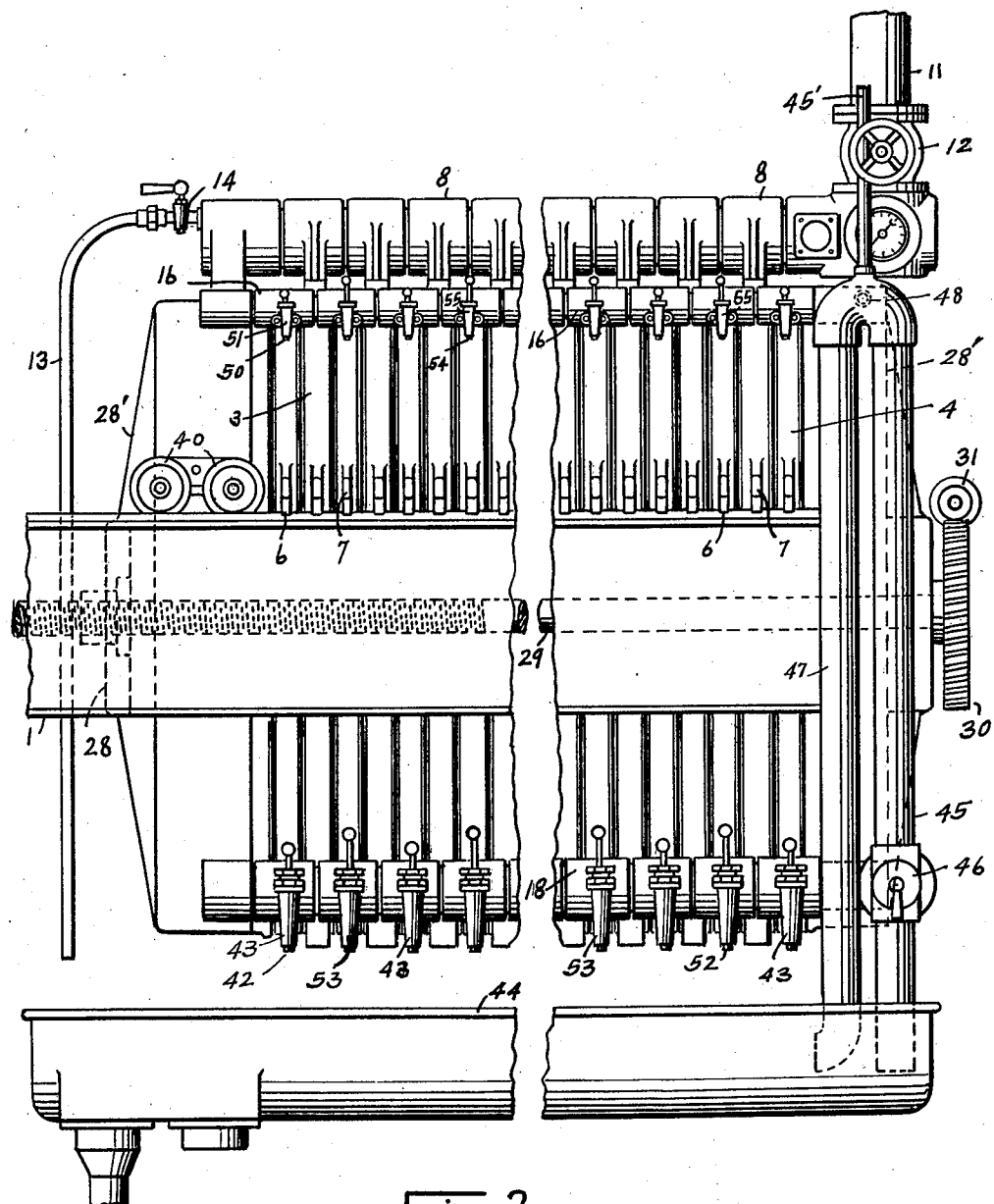
Figure 2 shows a fragmentary side view thereof.

When the frames are assembled as shown in Figure 2, with the chamber ends 28', 28' arranged at each end of the frame assembly, the frames may be clamped closely together by means of the clamp bracket 28 carried by one of the ends 28', which last mentioned end 28' may be drawn closely against the adjacent frame by means of the tension rods 29. These rods have threaded connections with said bracket 28 at the respective ends of the bracket and are arranged on opposite sides of the filtering chamber and at their other ends have the worm gears 30 thereon which are in mesh with corresponding screw gears 31 which may be suitably driven to turn the tension rods 29 to thereby move the clamp 28 into clamping position or into released position to move the corresponding chamber end 28' away from the frame assembly. The other end 28 is fixed in position.

Each grate frame is of special construction as more accurately shown in Figures 4 and 5. They have the relatively narrow vertical ribs 32, spaced apart. The ribs 32 are correspondingly notched at their upper and lower ends on one side to engage the tenons 34, 35, carried by the upper and lower side bars of the framework, and have sufficient end play to permit their ready removal and insertion and the ribs 33 at their ends are notched reversely, with respect to the notching of the ribs 32 and engage the upper and lower tenons 36, 37. These ribs 32, 33 are suitably anchored together by the cross bars 38 and when so anchored the rib assembly may be readily inserted into the framework, and when so inserted will be maintained in said surrounding framework by said upper and lower tenons. Each grate frame is enveloped on each side by a suitable fabric 39 which is folded so as to be supported by the top of the frame and to hang down on each side and the margins of the fabric are clamped between the frames of the assembly.

The bracket 28 employed for clamping the frame assembly together and for releasing the frame assembly is attached to the adjacent end 28' which is of considerable weight and said bracket is consequently supported at each end by the supporting wheels 40, 40, which run on the corresponding I-beams 1.

The mash enters, as hereinabove indicated, the hollow frames 3 through the channels 15 and fills said frames and the wort filters through the fabric 39 into the grate frames, the ribs of said last mentioned frames supporting said fabric.

Leading out from the bottom of each of the grate frames there is a duct 41. These ducts, of alternate grate frames, may be controlled by two-way valves 42, 52, respectively. When the valves are turned into one position, they permit the wort to flow from the grate frame, through the corresponding faucets 43, 53 into the tank 44 beneath and when said valves are turned into another position the duct 41 is connected back into the channel 22, as illustrated in Figure 3 and the wort may flow back into the upleg of the siphon pipe 45. Both ends of this siphon pipe are arranged to discharge into the tank 44, and the upleg thereof is controlled by a valve 46. If this last mentioned valve is turned into one position, the wort will be discharged directly downwardly into the tank 44 but if turned into another position the wort will rise through the upleg of the siphon pipe as well as in the filtering chamber and will eventually overflow into the down leg 47 and thence into the tank 44. The valves 42, 52 may be turned to a third position to close the corresponding outlet duct 41.

The channel 20 is connected into the upper end of the siphon pipe 45 by the valve controlled pipe 48, and the siphon pipe has the vent 45'.

Leading out from the upper ends of the grate frames are the ducts 49 which continue back into the channels 20 and these ducts of alternate frames are controlled by the two way valves 50, 54. These valves 50, 54 may be turned to open the corresponding faucets 51, 55 and to connect said grate frames directly into the channel 20 to relieve the air or overflow from the grate frames; or the valves 50, and/or 54 may be turned to completely close the ducts 49.

In the process of brewing it is obvious that the brew grain will collect in and gradually fill the open frames and the wort will filter through the fabric into the grate frames and during the normal filtering process the valves 42, 52 are turned so that the wort will pass into the channel 22 and thence into the up leg of the siphon pipe and the level of the liquid in the filtering chamber will thus be maintained at the same level as that of the liquid in the said siphon pipe, that is, the filtering chamber will be maintained practically filled with the liquid or wort. If the wort were drained off through the faucets 43, 53, the brew grain would tend to pack, particularly at the bottom of the hollow frames on account of the pressure of the liquid so that it would be more difficult to wash through the brew grain when it becomes necessary to wash it out.

At the end of a run, that is, when all of the wort which will drain out has been filtered from the mash, of a batch of mash, it is desirable to admit water into the filtering chamber in order to recover the remaining wort that may still remain in the brew grain. Water may be admitted through a main water pipe 56 which branches to either the upper channel 21 or the lower channel 23 and said branches are controlled by the valves 57, 57. The channels 21 are connected into the upper portions of alternate grate frames and the lower channel 23 is connected into the other grate frames at the bottom. If the water is admitted through the channel 21, the faucets at the both ends of said grate frames, connected with the channel 21, are closed and the water entering the top of the grate frames must pass through the hollow frames between them, passing through the brew grain therein and into the grate frames, between said last mentioned hollow frames, loaded with the wort and then goes on out through the open faucets of said last mentioned grate frames at the bottom. These faucets may be turned in such a way as to permit drainage into the tank 44 beneath or into the channel 22, and thence by way of the siphon pipe 45 into said tank.

If it be desired to wash from beneath, the water may be admitted into the channel 23 and the faucets 43, 51, closed and the faucets 53, 55, opened, and if the liquid in the filtering chamber rises high enough to overflow the excess will pass through pipe 48 into the siphon pipe. In other words when washing from above the faucets 43, 51 are open and the faucets 53, 55 are closed but when washing from beneath the reverse is true.

During the filtration process all of the faucets of the grate frames are open either to permit the wort to drain directly into the tank 44 or to permit the wort to flow indirectly into the channel 22 and thence to siphon pipe. During this operation all air faucets are open.

When the filtering process has been completed it is, of course necessary to remove the brew grain and to cleanse the hollow frames as well as the fabric. In order to accomplish this the rods or shafts 29 are turned in the reverse direction and the clamp bracket 28 and a corresponding chamber end 28' are moved outwardly thus permitting the frames to be moved apart whereupon the brew grain will fall voluntarily out of the hollow frames and the particular shape of the lower cross bars of the frames 3 prevent the collection of brew grain on these bars but permits said grain to readily fall out. The fabric may be then easily lifted off of the grate frames and washed for re-use and thereupon the frame assembly may be reassembled and the frames clamped in original position between the ends 28', 28' in readiness for another filtering process.

The drawings and description disclose what is now considered to be a preferred form of the invention by way of illustration only while the broad principle of the invention will be defined by the appended claims.

What I claim is:

1. A filter having a filtering chamber provided with ends and a series of hollow frames and grate frames alternately arranged, said ends and frames enclosing the chamber, filtering means enveloping the grate frames, means for delivering mash into the hollow frames from above, said filter having an upper water channel connected into the upper ends of some of the grate frames, the lower ends of the grate frames having controlled outlets, there being a lower channel into which the outlets are connected, an upstanding siphon pipe having an upleg and a downleg with the former of which said channel is connected, the upper end of said lower siphon pipe having a vent and having a valve controlled connection with the upper water channel and a valve controlling the connection between the siphon and lower channel.

2. A filter having a series of hollow frames and grate frames and provided with ends, said ends and frames enclosing a filtering chamber, filtering fabric between the hollow frames and grate frames, means for delivering mash into the hollow frames, a siphon pipe having an air vent at its upper end, upper and lower water channels, the upper channel being connected into some of the grate frames at their upper ends, the lower channel being connected into other of the grate frames at their lower ends, said grate frames having upper and lower outlets, and there being channels through which said outlets may be connected into the siphon pipe, valves controlling said channels, the valve which controls the lower channel controlling the connection of the siphon with said lower channel, faucets for controlling said outlets and whereby outlets for the outflow of liquid from the chamber may be selected.

3. In a filter, a grate frame comprising a main framework, a rib assembly composed of spaced ribs spanning the framework and cross bars tying the ribs in position, the ends of the ribs and the adjacent parts of the framework being provided one with tenons and the other with mortises to receive the tenons, said tenons and mortises forming the only means for maintaining the framework and rib assembly in assembled relation, said tenons being of such length relative to the depth of the mortises as to allow said rib assembly to be adjusted relative to the framework in a direction longitudinally of the ribs to a position to permit the release of the rib assembly from the framework.

4. In a filter a series of hollow frames for containing brew grain and having an inlet and grate frames arranged alternately with the hollow frames for containing wort, fabric enveloping the grate frames, means for clamping the frames together to form marginal fluid tight joints between them, said filter having an upper and a lower channel and the hollow frames being connected into said channels, the upper channel being connected into some of the grate frames at the top thereof and the lower channel being connected into the other grate frames at the bottom thereof, said grate frames having top and bottom outlets and means for controlling said outlets.

5. In a filter a series of hollow frames for containing brew grain and having an inlet and grate frames arranged alternately with the hollow frames for containing wort, fabric enveloping the grate frames, means for clamping the frames together to form marginal fluid tight joints between them, said filter having an upper and a lower channel and the hollow frames being connected into said channels, the upper channel being connected into some of the grate frames at the top thereof and the lower channel being connected into the other grate frames at the bottom thereof, said grate frames having top and bottom outlets and means for controlling said outlets and means for selectively supplying water to the upper and lower channels.

6. In a filter, a grate frame comprising a main framework, a rib assembly composed of spaced ribs and cross-bars tying the ribs together, tenon and mortise structures for mounting the rib assembly in the framework, the tenons at one end of the rib assembly being of such length relative to the depth of the corresponding mortises as to permit said ribs to be adjusted longitudinally as a unit to a position to permit the other tenons to be released from the mortise to permit the release of the rib assembly from the framework.

7. A filter having a filter chamber therein provided with upper and lower water channels, series of filter frames and hollow frames enclosing and forming said chamber, and some of said filter frames being connected into one of said channels, and other of said filter frames being connected into the other channel, the filter frames connected with one channel being arranged alternatively with respect to those connected into the other channel, filtering fabric between the filter frames and hollow frames, an inlet water pipe connected into said channels, means for delivering mash into the hollow frames from above, said filter having an air channel, means controlling the water channels whereby some of the frames may be isolated from said water pipe, there being a collecting channel arranged to collect the filtered liquid and a siphon with a faucet for controlling said collecting channel.

8. A filter having a filtering chamber therein provided with upper and lower water channels, series of filtering frames and hollow frames enclosing and forming said chamber, some of the filtering frames being connected into one channel and other of said filtering frames being connected into the other channel, the filtering frames connected with one channel being arranged alternatively with respect to those connected into the other channel, filtering means between the filtering frames and hollow frames, an inlet water pipe connected into said channels, means for delivering mash into the hollow frames from above, means controlling the water channels whereby some of the frames may be isolated from said water pipe, there being a collecting channel arranged to collect the filtered liquid and means for controlling said collecting channel.

PAUL MEURA.